Figure 1:
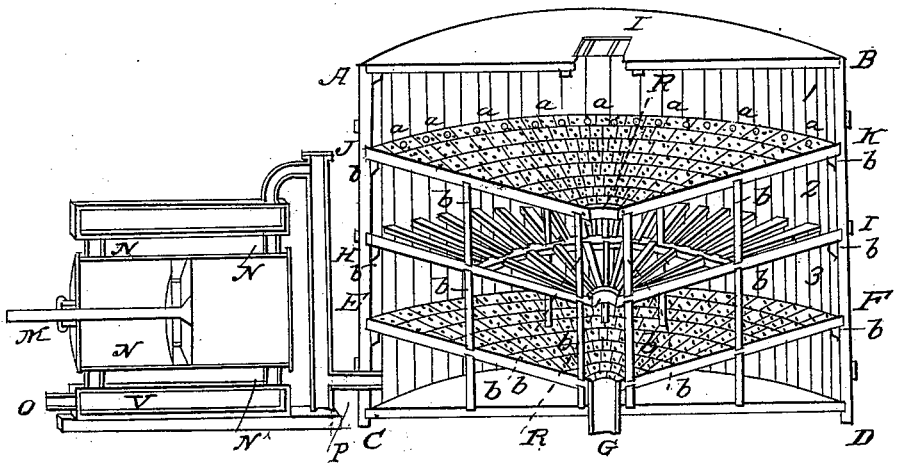

J. H. PATTEN.
Grain Drier.

No. 6,550.　　　　　　　　　　　　　　　　Patented June 19, 1849.

Witnesses　　　　　　　　　　　　　　　　Inventor

UNITED STATES PATENT OFFICE.

JOSEPH H. PATTEN, OF NEW YORK, N. Y.

DRYING GRAIN.

Specification of Letters Patent No. 6,550, dated June 19, 1849.

*To all whom it may concern:*

Be it known that I, JOSEPH H. PATTEN, a citizen of the United States, and a resident of the city of New York, have invented a new and useful Improvement in the Art of Drying Corn, Grain, Malt, White-Lead, Flour, Meal, or any Similar Substances.

The basis of my invention consists in forcing or drawing a current of air through the corn, grain, flour, white-lead or other substance to be dried, by means of a blowing cylinder, fan, blower or bellows, of sufficient power and of the ordinary construction.

For the purpose of drying corn or grain or malt or any similar substance, I construct a receptacle, square or in the shape of a cistern, say twelve feet in diameter, and eight feet high; a false bottom is laid a little above the real one; and this false bottom is perforated full of small holes, too minute to allow the grain or other substance to be dried, to fall through it. A blowing cylinder of the ordinary construction, (such for instance as is used in a blast furnace,) is connected with the bottom of the receptacle by a pipe secured firmly both with the receptacle and blower; this pipe entering the receptacle under the false bottom. If a vessel so arranged is now filled with damp corn, or grain, or malt, it is evident, if left to itself, instead of drying, it would only ferment and spoil; the aqueous vapor filling all the interstices of the grain, and preventing the desiccation of the grain, until this vapor is removed. To remove this vapor, the blowing cylinder is set in motion by a steam engine, or other motive machine, of sufficient power to force the air through this mass of corn or grain or other substance; this air, as it goes through the mass of grain or malt, removes the moisture; new moisture arises and is removed, and the grain rapidly dried. The drying of, or evaporation from any substance, depends solely upon its temperature, and on removing the vapor as fast as it is formed. By means of the blower, I have not only the entire control of the temperature, up to which I wish to heat the grain or other material to be dried, but I have also the means of removing the vapor as fast as formed.

For the purpose of heating the grain or other material to the requisite temperature, I have only to connect a pipe leading into the blowing cylinder with an atmosphere heated to the desired temperature; it may be the ordinary temperature of the atmosphere, especially in summer; or it may be the air heated by any of the artificial means of heating the air of houses or buildings now in ordinary use. The induction pipe of the blower may lead from that air, wherever or however it may be heated; or the air from the blower may be drawn through a heating apparatus, or into a chamber heated to the requisite temperature; and from this heater or chamber be conducted into the drying cistern or receptacle.

It is necessary here to remark that in all the methods heretofore used, the corn, grain or flour to be dried, is exposed to the great danger of being heated to a temperature that materially injures it. By most of the methods heretofore used the grain is actually in contact with a surface heated by steam to 212° or near it. This temperature radically injures all flour and meal and all grain intended for flouring. A temperature of about 100° of Fahrenheit, is amply sufficient for all safe and useful purposes. By my method air of this temperature can always be easily obtained, either in summer or winter.

The power of the apparatus to force the air into or through the material to be dried, must be proportioned to the resistance to be overcome; and whether a blowing cylinder, a bellows, or a fan blower, or other blowing apparatus now in use, shall be used, is only a question of power.

For the purpose of drying flour, meal or any pulverized substances, or which would be blown away by the current of air forced into or through it, I construct a receptacle similar to the one before described for corn, grain &c.; but this receptacle is closed, with an opening left in the top, sufficiently large to introduce and take out the substance to be dried, and through which opening the air escapes: over the false bottom a thick woolen or other loose cloth, or wire gauze or perforated plate is laid; which cloth or other article is carefully, tightly and closely nailed to the sides of the receptacle, at the edge or circumference of the false bottom, to prevent the air escaping in any other way than through the cloth or gauze. The opening in the top is also closed with a similar cloth or gauze, too fine in its texture to allow the flour or other pulverized substance to pass through it, and yet having area enough to let the requisite quantity of air forced into the receptacle pass off. This opening is also used for the putting in and taking out the flour, meal, &c.

The air, in all these processes, instead of being forced or driven through, can be drawn through such recipient, by closing the same with a tight head, connecting a pipe with the head or upper part of the said receptacle, and leading said pipe into the blower, fan, or bellows, and leaving an aperture into the bottom of the receptacle, connected with the air to be introduced. The blowing apparatus is then converted into an exhausting apparatus or blower, and the same effect is produced. The air, loaded with the dampness of the substance to be dried, is drawn into the blower, and ejected into the atmosphere; and if the substance to be dried is a powder, or liable to be moved by the current of air, it will be necessary to cover the entrance of the pipe entering the blower with a gauze or cloth.

Having thus explained the principle upon which my invention is founded; and the method and arrangement of the apparatus or machinery I have invented to carry into useful effect the various purposes intended, I now proceed to illustrate by sectional drawings the machinery and apparatus; and all said drawings are to be taken as a part of this specification.

Figure 1, is an apparatus devised and arranged by me for the purpose of drying corn, grain, malt or similar substances. A. B. C. D. is a receptacle made with staves and hooped like an ordinary cistern for water; it is twelve feet in diameter, and eight feet deep. A diaphragm, shaped like a hopper, is fixed in the receptacle, two feet above the bottom. This diaphragm is made by forming a frame work of wood; (as shown in the section at H. I. in Fig. 1. without the perforated plates;) the laths or rails of which the frame is made, are two inches thick and two inches wide; on this frame are nailed plates of metal or thin boards, filled with holes too small for the grain to fall through; the space between the bottom of the receptacle and this diaphragm is intended for an air chamber: a pipe or aperture, one foot in diameter, shown at G., for letting out the grain, leads from the diaphragm through the bottom of the receptacle, and fits close to the diaphragm and the bottom of the receptacle. This aperture is closed tightly by a plug, sliding valve or gate, at its exit from the receptacle. Two feet above this diaphragm I place another diaphragm, similar to the first, excepting that the plates full of holes are nailed on both sides of the rails, so as to make it a double diaphragm; it has tubes let through it, as shown at a. a. a. Two feet above this diaphragm I place another similar one. All these diaphragms are supported by the standards b. b. b. b. or by cleats nailed to the side of the receptacle.

A pipe from a blowing cylinder, or an ordinary blowing apparatus, enters the receptacle at P. under the lowest diaphragm into the air chamber: this pipe is firmly secured to the receptacle and to the blowing apparatus.

I have now a receptacle strongly and tightly made, with one single, and two double diaphragms, full of small holes; and each chamber, excepting the air chamber, connecting with the others, through the great apertures, R. and through the tubes, a. a. a. The air chamber has no communication with the upper chambers, except through the small holes with which this lowest diaphragm is filled. The receptacle may be covered, as shown in the section. If corn, grain, malt or any similar substance to be dried is poured into the top of the receptacle, it will fall through the openings R. and the tubes, a. a. a. and fill the three chambers, 1. 2. 3. Set the blower in motion, and the air is forced into the air chamber (air) and through the strata of grain in the chambers, 1. 2. and 3. until it makes its exit at the aperture L. carrying with it the damp vapor taken from the grain under process of drying, and giving to the grain its own temperature. The object of the diaphragm is to equalize the current of air, and to assist the air in passing through a too dense mass of grain. But there is no other use for the double diaphragm: for if a receptacle, of this or any other size or shape, is filled with corn, grain, &c., and is made of sufficient strength, and the blowing apparatus is of sufficient power, and the grain laid in a stratum sufficiently thin, the air would be forced through. But I consider the method here shown to be the best.

Figure 2:
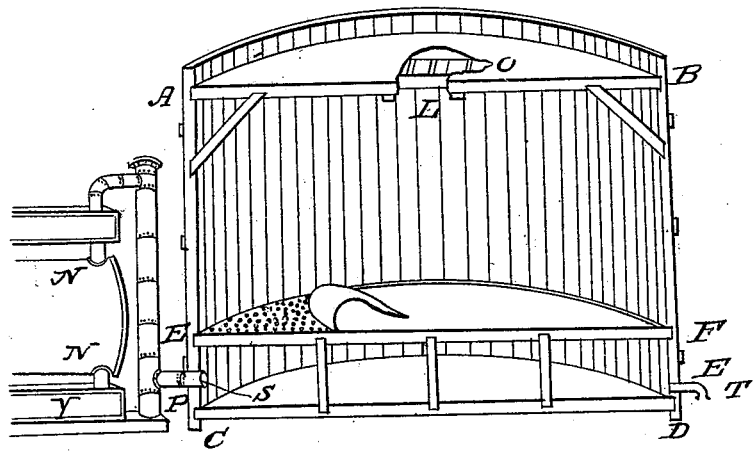

Fig. 2. A. B. C. D. represents a receptacle for drying flour, meal and other substances in powder, or which the current of air would blow away. This receptacle also is twelve feet in diameter and eight feet high, made of staves and hoops in the usual way. It ought to be well made and stoutly hooped; and it has a head let into the staves at A. B. made as tight as the bottom; with an opening four feet square at L.: it has a false bottom, shown at F. E. one foot above the real bottom: this bottom is horizontal and must be full of holes; it is made of thin boards nailed upon strips of plank or timber to support them: over this false bottom, a wire gauze or perforated plates or a woolen cloth or any cloth whose texture is sufficiently close to confine the flour or other substance, is laid, and very accurately and closely nailed to the side of the receptacle at the edge of the false bottom: it must be nailed so closely that the air cannot escape more easily between the cloth, gauze or plates and the side of the receptacle, than through the cloth, gauze, or plates themselves. If this is not securely done, a current of air will force itself through the badly nailed place in a large stream, instead of passing equally through the interstices of the cloth; this cloth, if not in one piece, must be carefully sewed together. The opening at L. is closed with a similar gauze or plates or a cloth, and nailed closely to the four sides of L. and open enough to let the air out. A pipe from a blowing cylinder of ordinary construction, enters the receptacle between the false and real bottoms at P. The receptacle is filled with flour or other substance liable to be blown away, through the opening at L.; the opening is then closed; the blower is set in motion, and forcing the air through the cloth or gauze or plates laid over the false bottom, and through the flour or other substance to be dried, carries off the moisture through the opening at L. The flour or other substance, after being sufficiently dried, is taken out through the opening at L. which being four feet in diameter, is large enough to admit a man to descend through it.

With regard to the blowing apparatus to be used, I prefer the ordinary double acting cylinder blower, used in iron furnaces. But, as is shown in the drawing, Fig. 1., there is an induction tube at O. leading into the air chamber V. by which the air goes into the blowing cylinder: a pipe or hose leads from this induction tube into the atmosphere of a room warmed in any ordinary way: this air, whatever may be its temperature, is drawn through the hose or pipe into the blowing cylinder and injected through the pipe P. into the receptacle: and this double acting, or any other, blower is easily converted into an exhausting apparatus, by which the air can be drawn through P. and through the receptacle into the blower, and ejected through the air tube taken away from P. But I think forcing the air through to be the best way. In drying corn, grain, malt, flour and similar substances, the ordinary temperature of a summer atmosphere, say from 80° to 110° of Fahrenheit, is all that is requisite; and can be obtained from any furnace in ordinary use to heat air for a dwelling house or other building, by connecting the induction pipe therewith.

What I claim as my invention and desire to secure by Letters Patent is—

The drying of a mass of corn or grain or malt or white lead or flour or meal or similar substances, in a receptacle for the substance to be dried, having the air chamber placed within the receptacle and under the mass or bulk of the corn, grain, flour, whitelead or other similar substance to be dried, and connected with a blowing or exhausting apparatus of sufficient power to drive or draw the air through and around the substances to be operated on, in the manner herein specified, or in any similar manner.

And I, the above named JOSEPH H. PATTEN, have invented the above described new and useful improvement in the art of drying corn, grain, meal, flour, white-lead and similar substances, and have called it "An improvement in the apparatus for drying corn, grain, &c., and substances in powder," of which the above, with its annexed drawings and explanations, is a full, accurate and proper description, and the said drawings are to be taken as a part of the specification.

In testimony of which I have hereunto subscribed my name, in the presence of two witnesses, whose names are also hereunto subscribed, in said city of New York, this eleventh day of April in the year of our Lord one thousand eight hundred and forty-nine.

JOS. H. PATTEN.

Signed in our presence:
  WILLIAM HOFFMAN,
  C. L. BUXTON.